3,403,077
COLORIMETRIC DETERMINATION OF CREATINE PHOSPHOKINASE

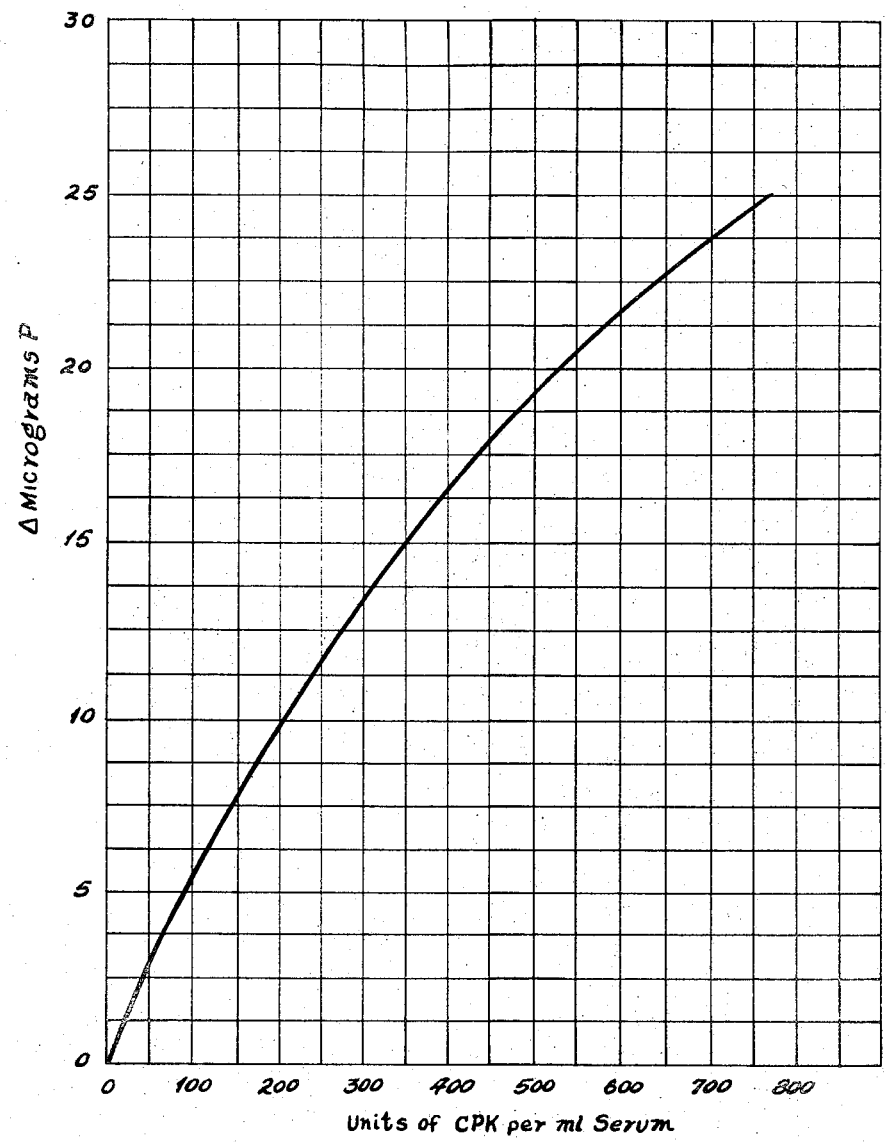

Louis Berger, University City, Daniel Broida, Ladue, and Leo F. Bressler, University City, Mo., assignors to Sigma Chemical Company, St. Louis, Mo., a corporation of Missouri
Filed Sept. 29, 1965, Ser. No. 491,196
7 Claims. (Cl. 195—103.5)

ABSTRACT OF THE DISCLOSURE

The level of creatine phosphokinase in serum or other fluids is determined by its action as a catalyst in the reaction of adenosine triphosphate (ATP) with creatine to form adenosine diphosphate (ADP) and phosphocreatine, using a magnesium sulfate-tris hydroxy methyl amino methane buffer to maintain a pH of about 9.0, and adding at least 0.0005 molar sulfhydryl compound.

BACKGROUND OF THE INVENTION

This invention relates to the measurement of creatine phosphokinase in serum or other fluids.

A number of investigators have reported that the level of creatine phosphokinase, hereinafter referred to as CPK, in human serum is a useful index in the differential diagnosis of a variety of disorders. Highly elevated levels of CPK have been reported in serum from patients with Duchenne type muscular dystrophy, somewhat less elevated levels with limb-girdle type, and essentially normal values for facio scapulohumeral types. Temporarily elevated values of CPK have been reported with mild myocardial infarctions, but essentialy normal values have been reported with pulmonary infarctions. Both moderately severe muscular exercise and hypothyrodism have also been reported to give elevated CPK levels. Essentially normal values have been reported in a wide variety of disorders.

The determination of CPK is based on the fact that it is a specific catalyst for a reversible reaction in which adenosine triphosphate (ATP) and creatine react to form adenosine diphosphate (ADP) and phosphocreatine:

(1) ATP+creatine⇌ADP+phosphocreatine

The equilibrium of reaction (1) is extremely pH dependent. The optimum pH for the forward reaction (toward the ADP and phosphocreatine) is about 9; for the reverse it is about 7.2.

Both the forward and the reverse reactions have been used in a variety of methods for determining CPK. One of the first methods used (Ebashi et al., J. Biochem. (Tokyo), 46, 103) utilized the forward reaction and measured colorimetrically free phosphorus from the hydrolysis of the phosphocreatine formed. This method has proved to be quite simple, but it has not proved to be very sensitive. Furthermore, it requires that tests be run on serum samples within a few hours of the time the samples are taken, because even samples stored at freezing show varying decreases in CPK activity when assayed by this method.

Because of these disadvantages a number of alternative methods have been proposed. Tanzer and Gilvarg (J. Biol. Chem., 234, 3201) couple with the forward reaction (1) the following reactions:

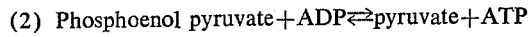

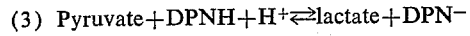

The rate of oxidation of DPNH is measured with a UV spectrophotometer at 340 mu. Some of the difficulties of this method are immediately obvious. A spectrophotometer sensitive in the range of 340–360 mu is required. A constant temperature of 25° C. is required during the entire time that readings are being taken. Readings must be taken at precise time intervals. Furthermore, this method requires two ml. of serum, and gives very low, hence inaccurate, readings for normal serum. Despite these drawbacks, this seems to be the most frequently reported method.

Other investigators have used the reverse reaction (1). As early as 1954 Ennor and Rosenberg reported on a series of experiments involving both forward and reverse reaction (1) at a pH of 10.5 for the forward reaction (1) and 7.2 for the reverse (Biochem. J., 57, 203). Using purified CPK from sheep skeletal muscle and determining the quantity of creatine remaining or formed, they reported, among other things, two important findings. First, they found that in spite of many experiments, fifty times as much CPK was required for the forward reaction (1) as for the reverse reaction (1) in order to retain a convenient reaction rate. Second, they found that although the addition of cysteine produced an acceleration in the reaction rate of the reverse reaction (1), it had no effect on the speed of the forward reaction (1). More recent investigators have followed the teachings of Ennor and Rosenberg. Hughes (Clinica Chemica Acta, 7,597, (1962)) uses the reverse reaction (1), adds a sulfhydryl compound, and measures the creatine formed. He has found that this method gives a linear relation between the amount of CPK and the amount of creatine formed, and gives reproducible results, although the sulfhydryl compound interferes with the estimation of creatine. Nielson and Ludvigsen (J. Lab. & Clin. Med., 62, 159 (1963)) use still another method, requiring 1.75 ml. of serum and cite Ennor and Rosenberg for the proposition that comparable measurements using the forward reaction (1) require fifty times as high a concentration of CPK.

One of the objects of this invention is to provide a simple and accurate method of measuring creatine phosphokinase.

Another object of this invention is to provide such a method in which sera to be assayed may be stored as well as fresh.

SUMMARY OF THE INVENTION

Other objects will become apparent to those skilled in the art in the light of the following description.

In accordance with this invention, generally stated, an improvement in the method of determining creatine phosphokinase by reacting ATP with creatine in the presence of CPK to form ADP and phosphocreatine, is provided in which a sulfhydryl compound is added to the reaction mixture. Contrary to the teachings of Ennor and Rosenberg, supra, it has been found that under the reaction conditions used in the method of this invention at a pH of about 9.0 the addition of a sulfhydryl compound gives a several fold increase in the reaction rate and far more reproducible results, even with serum which has been stored for a considerable period. Thus, a highly sensitive and reproducible method of determining CPK is provided, in which only a small quantity of serum is required.

The method of the present invention may be applied to numerous procedures utilizing the forward reaction (1), and measuring either ADP or phosphorcreatine. However, it has particular application to the procedure in which creatine phosphate is hydrolyzed and the inorganic phosphorus released is measured colorimetrically. This procedure has the advantages of simplicity and ease of adaptation to multiple determinations.

DESCRIPTION OF THE PREFERRED EMBODIMENT

In the usual procedure, known quantities of ATP and creatine are mixed in the presence of a known volume of solution containing an unknown concentration of CPK. After a precisely determined period of time, the reaction is stopped, the phosphocreatine is hydrolyzed, and the inorganic phosphate is determined by the method of Fiske and Subbarow (J. Biol. Chem., 66, 375 (1925)), hereinafter referred to as F&S. The F&S method of determining phosphate involves the formation of a highly colored molybdate complex. The optical density or transmission of this complex is then determined, and the phosphorus concentration is determined by reference to a simple chart.

To prepare a typical chart, which is simply a calibration curve, for a particular colorimeter and a particular wave length, the optical density or transmission of the complex resulting from various known concentrations of phosphate, within the expected range, is plotted against weight of phosphorus. As an example of a method of preparing a calibration curve, six samples of phosphate solutions can be made up as indicated in the following table:

TABLE 1

| Tube No. | Ml. 0.00645 molar $KH_2PO_4$ | Ml. water | O.D. or percent T | Micrograms of P | Equiv. to units of CPK/ml. serum |
| --- | --- | --- | --- | --- | --- |
| 1 | 0 | 5.00 | (¹) | 0 | 0 |
| 2 | 0.25 | 4.75 | | 5 | 13.3 |
| 3 | 0.50 | 4.50 | | 10 | 26.7 |
| 4 | 0.75 | 4.25 | | 15 | 40.0 |
| 5 | 1.00 | 4.00 | | 20 | 53.3 |
| 6 | 1.25 | 3.75 | | 25 | 66.7 |

¹ Zero O.D. or 100% T.

To each of the tubes is added 0.50 ml. of 5 N sulfuric acid and 0.50 ml. of standard molybdate solution (2.5% $(NH_4)_6Mo_7O_{24}\cdot 4H_2O$ in water).

The solutions are mixed by lateral shaking. To each of the samples is added 0.25 ml. standard F&S reducer solution. F&S reducer solution is made up by adding, to 6.3 ml. water, 1 g. of a solid consisting of one part 1 amino 2 naphthol 4 sulfonic acid, one hundred twenty parts sodium bisulfite and four parts sodium sulfite. The samples are allowed to stand at room temperature (25°±5° C.) for ten minutes. At the end of this ten minute period, and within an additional ten minute period, the optical density or transmission of each sample is measured against the first as a reference. It has been found that the range of wave lengths 660 mu (±40 mu) is particularly convenient. When optical density is plotted against micrograms of phosphorus on ordinary graph paper, a calibration curve will result which passes through the origin. If the colorimeter is accurate, this calibration curve will be a straight line.

As an example of a presently known method of determining CPK by the forward reaction 1, and subsequent colorimetric determination of phosphate, the following example is given.

Example 1 (prior art)

The following reagents are accurately pipetted into 15 ml. test tubes or centrifuge tubes:

TABLE 2

| Reagent | Test 1 (ml.) | Blank 2 (ml.) |
| --- | --- | --- |
| Mg-tris buffer (0.0144 M $M_gSO_4$, 0.23 M tris hydroxy methyl amino methane, pH 9.0 at 37° C.) | | 1.0 |
| Creatine solution (0.0576 M Creatine, 0.0144 M $M_gSO_4$ 0.23 M tris hydroxy methyl amino methane, pH 9.0 at 37° C.) | 1.0 | |
| Serum | 0.4 | 0.4 |
| Water | 0.8 | 0.8 |

Both tubes are placed in a water bath at 37° C. and allowed to come to temperature. To each is added 0.20 ml. standard ATP solution (15 mg. ATP per ml. water). The exact time is noted, and the tubes are shaken gently and replaced in the bath for a thirty minute incubation period. During this incubation period, the following three tubes are prepared:

TABLE 3

| Reagent | Molybdate reference 3 (ml.) | Test 4 (ml.) | Blank 5 (ml.) |
| --- | --- | --- | --- |
| Molybdate solution (2.5% $(NH_4)_6Mo_7O_{24}\cdot 4H_2O$ in water) | 1.0 | 1.0 | 1.0 |
| Sulfuric acid (5N) | 1.0 | 1.0 | 1.0 |
| Water | 7.5 | 6.5 | 6.5 |

At the end of the thirty minute incubation period, 1.6 ml. of cold 20% trichloroacetic acid is added to each of tubes 1 and 2 and both solutions are mixed by inversion to stop the reaction. Tubes 1 and 2 are then centrifuged for about five minutes, until the solutions are clear.

Inorganic phosphorus is then determined as follows. One ml. of Test-1 solution is pipetted into Test-4. One ml. of Blank-2 solution is pipetted into Blank-5. The resulting Test and Blank solutions are mixed and allowed to stand at room temperature for thirty minutes for the creatine phosphate formed in the reaction to hydrolyze. To each of tubes 3, 4 and 5 is added 0.50 ml. of F&S reducer solution (1.0 g. solid F&S reducer in 6.3 ml. water). The solutions are allowed to stand at room temperature for 10 minutes, for color development. At the end of this 10 minute period, and within an additional 10 minutes, the optical density of the Test and Blank solutions are determined at 660 mu., using the Molybdate Reference solution as a reference. The same instrument is used for the readings as was used to prepare the calibration curve. The quantity of phosphorus in the Test and Blank tubes is determined from the calibration curve. The difference between the quantity of phosphorus in the Test solution and in the Blank solution is the quantity of phosphorus transferred in reaction (1), and is proportional to the activity of the CPK in the reaction mixture.

The unit of activity of CPK is usually defined as the quantity of CPK which will phosphorylate one unit of creatine per unit of time, under the particular assay conditions. One Unit of activity of CPK, as hereinafter used, will phosphorylate one millimicromole of creatine per minute under the assay conditions.

The improved method of this invention is illustrated in the following example.

Example 2

The following reagents are accurately pipetted into 15 ml. test tubes or centrifuge tubes:

TABLE 4

| Reagent (all reagents are the same as in Table 2) | Test-1 (ml.) | Blank-2 (ml.) |
| --- | --- | --- |
| Mg. buffer | | 1.0 |
| Creatine solution | 1.0 | |
| Serum | 0.3 | 0.3 |
| Water | 1.0 | 1.0 |

Both tubes are placed into a water bath at 47° C. and allowed to come to temperature. To each tube is added 0.10 ml. ATP-Glutathione solution (6.2 mg. ATP as the disodium salt, crystalline, with three waters per mol and 3.8 mg. glutathione in reduced form). The exact time is noted, and the tubes are shaken gently and replaced in the bath for a thirty minute incubation period. During this incubation period, the following three tubes are prepared:

TABLE 5

| Reagent (all reagents are the same as in Table 3) | Molybdate reference (ml.) | Test-4 (ml.) | Blank-5 (ml.) |
| --- | --- | --- | --- |
| Molybdate solution | 0.5 | 0.5 | 0.5 |
| Sulfuric acid | 0.5 | 0.5 | 0.5 |
| Water | 5.0 | 5.0 | 5.0 |

At the end of the thirty minute incubation period, 1.6 ml. of cold 20% trichloroacetic acid is added to each of tubes 1 and 2 and both solutions are mixed by inversion to stop the reaction. The solutions are then allowed to stand for about five minutes. Tubes 1 and 2 are then centrifuged for about five minutes until the solutions are clear.

The quantity of phosphorus transferred in reaction (1) is then determined in precisely the same manner as in Example 1, except that only 0.25 ml. of F&S reducer solution is required. In this procedure, however, the quantity of phosphorus transferred does not bear a linear relation to the quantity of CPK present. Therefore, to get activities of CPK in units which are directly comparable with those obtained by methods known heretofore, and in particular with the method of Example 1, it is necessary to prepare a table or chart from experiments with known quantities of CPK. Such a chart has been prepared and is shown in the drawing. It will be appreciated that although a phosphorus calibration curve must be made for each individual instrument on which measurements are to be taken, the chart shown in the drawing gives an absolute relation between quantity of phosphorus transferred and Units of CPK per ml. of serum.

The rate of reaction, hence the accuracy of the method of Example 2 is at least ten times that of Example 1. This is particularly important in measuring relatively low CPK levels in the border-line area between normal and elevated CPK values. Furthermore, although variable decreases in CPK activity up to about 50% in 24 hours are observed in sera stored frozen and assayed by the method of Example 1, sera stored frozen for two weeks and assayed by the method of Example 2 show no more than 10% decreases.

Another example of a procedure utilizing the method of this invention is as follows:

Example 3

The same procedure is followed as in Example 2, except that instead of an ATP-glutathione solution, an ATP-cysteine solution (6.2 mg. ATP and 3 mg. cysteine is used).

Example 4

The same procedure is followed as in Example 2, except that instead of an ATP-gultathione solution an ATP-2 mercapto ethanol solution (6.2 mg. ATP and 0.95 mg. 2 mercapto ethanol) is used.

Example 5

The same procedure was followed as in Example 2, except that in the 0.1 ml. of ATP-sulfhydryl solution containing 6.2 mg. ATP the following amounts of the sulfhydryl compound were used in separate assays:

(a) Glutathione
(i) 7.6 mg. (.01 molar)
(ii) 3.8 mg. (.005 molar)
(iii) 1.9 mg. (.0025 molar)
(iv) 0.38 mg. (.0005 molar)

(b) Cysteine
(i) 3.0 mg. (.01 molar)
(ii) 1.5 mg. (.005 molar)
(iii) 0.75 mg. (.0025 molar)
(iv) 0.15 mg. (.0005 molar)

(c) 2 mercapto ethanol
(i) 1.9 mg. (.01 molar)
(ii) 0.95 mg. (.005 molar)
(iii) 0.48 mg. (.0025 molar)
(iv) 0.095 mg. (.0005 molar)

In the tests represented by Example 5, it was found that with the same serum, the CPK activities measured when the sulfhydryl compound was added were in the neighborhood of four times as high as the activities measured in the absence of the sulfhydryl compound. The measured activities for all of the tests with all three of the sulfhydryl compounds at the concentrations above 0.0005 molar were consistent. At the 0.0005 molar level of sulfhydryl compound under these test conditions, the activity as determined began to decrease, so that under these test conditions, the lower limit of sulfhydryl compound for accuracy is about 0.0005 molar.

It has been reported that the degree of deterioration of activity of serum stored for a period varies depending on the cause of elevated CPK levels. Thus, it is felt that if "Test" samples are made up from identical serum and identical tests run except that in one the sulfhydryl compound is omitted and the apparent activity of this sample is compared with that of the other Test sample, the comparison of the CPK activities of these two samples may be a valuable aid in differentiating possible sources of elevated CPK levels.

Numerous variations in the method of this invention within the scope of the appended claims will occur to those skilled in the art in the light of the foregoing disclosure. For example, either the length of the incubation period or the temperature of incubation or both can be made different from the period and temperature (thirty minutes and 37° C.) set out in the preferred embodiments described, as long as the time and temperature are accurately pre-determined and an appropriate chart prepared and used. The time period and temperature described are preferred because the range of activity of the CPK which can be accommodated with these conditions is high and the upper level of normal activity is within a range of high accuracy. The order in which the reactants are mixed prior to incubation may also be varied, provided a reactant is added last which starts the reaction, so that the moment of initiation of the reaction (incubation) period can be determined accurately. Thus, the reaction can be started by adding the creatine as the final reactant or by adding the serum as the final reactant, instead of the ATP solution. Other methods of measuring the phosphorus may also be employed, such for example, as the Tossky and Shore determination, though the F&S method is the preferred one. These examples of variations are merely illustrative.

Having thus described the invention, what is claimed and desired to be secured by Letters Patent is:

1. The method of determining the level of CPK in serum comprising mixing a known quantity of serum, creatine, ATP, and a sulfhydryl compound chosen from the group consisting of glutathione, cysteine and 2-mercapto ethanol to a concentration of at least about 0.0005 molar, reacting the reactants at a constant temperature for a known time, at a pH of about 9.0, and thereafter determining the quantity of phosphocreatine formed.

2. The method of claim 1 wherein the sulfhydryl compound is glutathione in reduced form.

3. The method of determining creatine phosphokinase comprising mixing creatine solution and serum containing creatine phosphokinase, bringing the mixture to a predetermined incubation temperature, adding to the mixture ATP-glutathione solution containing at least sufficient glutathione in reduced form to produce a 0.0005 molar solution of glutathione, and allowing the mixture to incubate at a pH of about 9 for a precisely predetermined period; stopping the reaction of the mixture at the end of the incubation period; determining the amount of phosphorus transferred, and relating the amount of phosphorus transferred to units of CPK in the serum.

4. The method of claim 3 wherein the incubation temperature is 37° C. and the incubation period is one-half hour.

5. The method of claim 3 wherein the amount of phosphorous transferred is measured colorimetrically, using 0.5 ml. molybdate solution, 0.5 ml. sulfuric acid, 5.0 ml. water, and 0.25 ml. F&S reducer solution.

6. In the method of determining creatine phosphokinase by reacting in the forward direction adenosine triphosphate with creatine in the presence of an unknown quantity of creatine phosphokinase to form adenosine diphosphate and phosphocreatine, the improvement comprising adding to the reaction mixture to a concentration of at least about 0.0005 molar a sulfhydryl compound taken from the group consisting of glutathione, cysteine and 2-mercapto ethanol and a buffer to maintain a pH of about 9.0.

7. The method of determining creatine phosphokinase comprising mixing creatine, magnesium sulfate, tris hydroxy methyl amino methane buffer to maintain the mixture at a pH of about 9.0, serum containing creatine phosphokinase, and water, and bringing the mixture to a predetermined incubation temperature, adding to the mixture ATP-sulfhydryl compound solution in which the sulfhydryl compound is chosen from the group consisting of glutathione, cysteine and 2-mercapto ethanol and is present in the mixture in a concentration of at least .0005 molar, and allowing the mixture to incubate for a predetermined period; stopping the reaction of the mixture at the end of the incubation period; determining the amount of phosphorus transferred, and relating the amount of phosphorus transferred to units of CPK in the serum.

References Cited

Ennor et al.: Biochemical Journal, vol. 57, pp. 203–212, 1954.

Medical World News, pp. 84 and 85, Dec. 20, 1963.

ALVIN E. TANENHOLTZ, *Primary Examiner.*

UNITED STATES PATENT OFFICE
CERTIFICATE OF CORRECTION

Patent No. 3,403,077                                           September 24, 1968

Louis Berger et al.

It is certified that error appears in the above identified patent and that said Letters Patent are hereby corrected as shown below:

In the heading to the drawing and printed specification, title of the invention, "COLORIMETRIC DETERMINATION OF CREATINE PHOSPHOKINASE" should read -- DETERMINATION OF CREATINE PHOSPHOKINASE --. Column 1, line 36, "hypothrodism" should read -- hypothyroidism --. Column 2, line 46, cancel "SUMMARY OF THE INVENTION" and insert the same between lines 38 and 39, same column 2; line 66, "phosphorcreatine" should read -- phosphocreatine --. Column 3, line 16, after "curve" cancel the comma. Column 4, line 56, "47° C." should read -- 37° C. --.

Signed and sealed this 10th day of February 1970.

(SEAL)
Attest:

Edward M. Fletcher, Jr.                          WILLIAM E. SCHUYLER, JR.

Attesting Officer                                     Commissioner of Patents